US010089352B2

(12) United States Patent
Asaad et al.

(10) Patent No.: US 10,089,352 B2
(45) Date of Patent: *Oct. 2, 2018

(54) OFFLOADING PROJECTION OF FIXED AND VARIABLE LENGTH DATABASE COLUMNS

(71) Applicant: International Business Machines Corporation, Armonk, NY (US)

(72) Inventors: Sameh W. Asaad, Briarcliff Manor, NY (US); Parijat Dube, Yorktown Heights, NY (US); Hong Min, Poughkeepsie, NY (US); Bharat Sukhwani, Briarcliff Manor, NY (US); Matthew S. Thoennes, West Harrison, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/372,653

(22) Filed: Dec. 8, 2016

(65) Prior Publication Data

US 2017/0083570 A1   Mar. 23, 2017

Related U.S. Application Data

(63) Continuation of application No. 14/868,678, filed on Sep. 29, 2015, now Pat. No. 9,535,947, which is a (Continued)

(51) Int. Cl.
*G06F 17/30* (2006.01)
*G06F 17/27* (2006.01)

(52) U.S. Cl.
CPC .... *G06F 17/30424* (2013.01); *G06F 17/2705* (2013.01); *G06F 17/30289* (2013.01);
(Continued)

(58) Field of Classification Search
CPC .......... G06F 17/30424; G06F 17/2705; G06F 17/30315; G06F 17/30289;
(Continued)

(56) References Cited

U.S. PATENT DOCUMENTS

| 5,737,595 A | 4/1998 | Cohen et al. |
| 5,754,556 A | 5/1998 | Ramseyer et al. |

(Continued)

FOREIGN PATENT DOCUMENTS

| JP | 2000181901 A | 6/2000 |
| JP | 2005180958 A | 7/2005 |
| JP | 2011087730 A | 5/2011 |

OTHER PUBLICATIONS

Arce-Nazario et al., "Reconfigurable Hardware Implementation of a Multivariate Polynomial Interpolation Algorithm"; International Journal of Reconfigurable Computing; vol. 2010, Article ID 313479; 14 pages.
(Continued)

*Primary Examiner* — Anh Ly
(74) *Attorney, Agent, or Firm* — Cantor Colburn LLP; Rabin Bhattacharya

(57) ABSTRACT

A computer-implemented method includes determining that a database query warrants a first projection operation to project a plurality of input rows to a plurality of projected rows, where each of the plurality of input rows has one or more variable-length columns. A first projection control block is constructed, by a computer processor, to describe the first projection operation. The first projection operation is offloaded to a hardware accelerator. The first projection control block is provided to the hardware accelerator, and the first projection control block enables the hardware accelerator to perform the first projection operation at streaming rate.

2 Claims, 7 Drawing Sheets

Related U.S. Application Data continuation of application No. 13/946,194, filed on Jul. 19, 2013, now Pat. No. 9,235,564.

(52) U.S. Cl.
CPC .. *G06F 17/30315* (2013.01); *G06F 17/30345* (2013.01); *G06F 17/30442* (2013.01); *G06F 17/30516* (2013.01)

(58) Field of Classification Search
CPC ......... G06F 17/30442; G06F 17/30345; G06F 17/30516; G06F 17/30
See application file for complete search history.

(56) References Cited

U.S. PATENT DOCUMENTS

| | | | |
|---|---|---|---|
| 5,758,144 A | 5/1998 | Eberhard et al. | |
| 6,185,555 B1 | 2/2001 | Sprenger et al. | |
| 6,853,385 B1 | 2/2005 | MacInnis et al. | |
| 7,103,590 B1 | 9/2006 | Viurthy et al. | |
| 7,505,036 B1 | 3/2009 | Baldwin | |
| 7,769,577 B2 | 8/2010 | Guenther et al. | |
| 7,908,259 B2 | 3/2011 | Branscome et al. | |
| 8,244,718 B2 | 8/2012 | Chamdani et al. | |
| 8,447,791 B1* | 5/2013 | Patriquin | G06F 17/30575 707/803 |
| 8,850,223 B1 | 8/2014 | Helsel et al. | |
| 2001/0045958 A1 | 11/2001 | Hochmuth et al. | |
| 2002/0143743 A1 | 10/2002 | Iyer et al. | |
| 2004/0117037 A1 | 6/2004 | Hinshaw et al. | |
| 2004/0122837 A1 | 6/2004 | Lee et al. | |
| 2004/0210663 A1 | 10/2004 | Phillips et al. | |
| 2004/0225744 A1 | 11/2004 | Frossard et al. | |
| 2004/0250059 A1 | 12/2004 | Ramelson et al. | |
| 2005/0049996 A1 | 3/2005 | Srinivasan et al. | |
| 2005/0278502 A1 | 12/2005 | Hundley | |
| 2005/0281280 A1* | 12/2005 | Zur | H04L 67/1097 370/419 |
| 2006/0018467 A1 | 1/2006 | Steinmetz | |
| 2006/0168334 A1 | 7/2006 | Potti et al. | |
| 2007/0243898 A1 | 10/2007 | Eyre et al. | |
| 2008/0140662 A1 | 6/2008 | Pandya | |
| 2008/0189251 A1 | 8/2008 | Branscome et al. | |
| 2008/0222136 A1 | 9/2008 | Yates et al. | |
| 2009/0147787 A1 | 6/2009 | Arulambalam et al. | |
| 2009/0254132 A1* | 10/2009 | Scribner | A61B 17/8855 606/86 R |
| 2009/0254516 A1* | 10/2009 | Meiyyappan | G06F 17/30492 707/E17.017 |
| 2009/0254532 A1* | 10/2009 | Yang | G06F 17/30315 707/E17.014 |
| 2009/0254774 A1 | 10/2009 | Chamdani et al. | |
| 2009/0287628 A1 | 11/2009 | Indeck et al. | |
| 2010/0017008 A1* | 1/2010 | Yelchuru | G05B 19/41875 700/108 |
| 2010/0128998 A1* | 5/2010 | Wegener | G06T 9/00 382/248 |
| 2010/0332654 A1* | 12/2010 | Bose | G06F 3/1415 709/224 |
| 2011/0004883 A1 | 1/2011 | El-Moursy et al. | |
| 2011/0016157 A1* | 1/2011 | Bear | G06F 17/30312 707/804 |
| 2011/0295967 A1 | 12/2011 | Wang et al. | |
| 2012/0047126 A1 | 2/2012 | Branscome et al. | |
| 2012/0158774 A1 | 6/2012 | Balkesen et al. | |
| 2012/0284492 A1 | 11/2012 | Zievers | |
| 2013/0086096 A1 | 4/2013 | Indeck et al. | |
| 2013/0195377 A1* | 8/2013 | Muninder | G06K 9/6203 382/294 |
| 2013/0279763 A1* | 10/2013 | Wang | G06T 7/2033 382/107 |
| 2014/0052713 A1* | 2/2014 | Schauer | G06F 17/30412 707/E17.082 |
| 2014/0052743 A1* | 2/2014 | Schauer | G06F 17/30442 707/E17.005 |
| 2014/0108481 A1 | 4/2014 | Davis et al. | |
| 2014/0165021 A1 | 6/2014 | Pattichis et al. | |
| 2014/0324888 A1* | 10/2014 | Xie | G06F 3/017 707/748 |
| 2016/0188181 A1* | 6/2016 | Smith | G06F 3/048 715/765 |
| 2017/0083570 A1* | 3/2017 | Asaad | G06F 17/30442 707/E17.014 |

OTHER PUBLICATIONS

Garcia et al., "An Overview of Reconfigurable Hardware in Embedded Systems", EURASIP Journal on Embedded Systems, vol. 2006, Article ID 56320, p. 1-19.

Luo et al., "A Novel All-Binary Motion Estimation (ABME) With Optimized Hardware Architectures" IEEE Transactions on Circuits and Systems for Video Technology, vol. 12, No. 8, Aug. 2002—pp. 700-712.

Mueller et al., "Streams on Wires—A Query Compiler for FPGAs", VLDB ' 09, Aug. 24-28, 2009; Lyon, France; 12 pgs.

Sukhwani et al., "Large Payload Streaming Database Sort and Projection on FPGAs"—Computer Architecture and High Performance Computing (SBAC-PAD), 2013 25th International Symposium on Date of Conference: 2013; Porto de Galinhas;—pp. 25-32.

Sukhwani et al., "Database Analytics Acceleration using FPGAs" PACT ' 12, Sep. 19-23, 2012; Minneapolis, Minnesota, pp. 411-420.

\* cited by examiner

OFFLOADING PROJECTION OF FIXED AND VARIABLE LENGTH DATABASE COLUMNS

CROSS-REFERENCE TO RELATED APPLICATION

This application is a continuation of U.S. patent application Ser. No. 14/868,678, filed Sep. 29, 2015, now U.S. Pat. No. 9,535, 947, issued Jan. 3, 2017, which in turn claims priority from U.S. patent application Ser. No. 13/946,194 filed Jul. 19, 2013, now U.S. Pat. No. 9,235,564, issued Jul. 19, 2013. The entire contents of both these applications are incorporated herein by reference.

BACKGROUND

Various embodiments of this disclosure relate to database management systems and, more particularly, to offloading data for hardware projection of fixed and variable length columns of database tables.

Projection refers to the process of parsing records (i.e., rows) of a database table to select certain fields from the records and arrange them in a specified manner. This is generally performed to report the rearranged fields to an application, or to enable more effective sorting of the records over a sort key that has been arranged as needed in the projection results. In current database management systems (DBMSs), projection is generally performed in software and incurs large costs on the central processing unit (CPU).

SUMMARY

In one embodiment of this disclosure, a system includes a query recipient and a projection controller. The query recipient is configured to determine that a database query warrants a first projection operation to project a plurality of input rows to a plurality of projected rows. Each of the plurality of input rows has one or more variable-length columns. The projection controller is configured to construct a first projection control block to describe the first projection operation. To construct the first projection control block, the projection controller is further configured to construct a plurality of projection control elements, where each projection control element corresponds to a corresponding column in the plurality of input rows, and to construct a header to specify the order of the projection control elements in the first projection control block. The projection controller is further configured to offload the first projection operation to a hardware accelerator. The projection controller is further configured to provide the first projection control block to the hardware accelerator, where the first projection control block enables the hardware accelerator to perform the first projection operation at streaming rate.

In another embodiment, a computer program product includes a computer readable storage medium having computer readable program code embodied thereon. The computer readable program code is executable by a processor to perform a method. The method includes determining that a database query warrants a first projection operation to project a plurality of input rows to a plurality of projected rows, where each of the plurality of input rows has one or more variable-length columns. Further according to the method, a first projection control block is constructed, by a computer processor, to describe the first projection operation. This construction includes constructing a plurality of projection control elements, where each projection control element corresponds to a corresponding column in the plurality of input rows, and constructing a header to specify the order of the projection control elements in the first projection control block. The first projection operation is offloaded to a hardware accelerator. The first projection control block is provided to the hardware accelerator, and the first projection control block enables the hardware accelerator to perform the first projection operation at streaming rate.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure enable offloading projection operations to hardware accelerators. Performing projection in hardware is advantageous for various reasons. When an application issues a database query that indicates projection, performing that projection in hardware formats the data in a way the application requires, thus relieving the host processor of this burden. Secondly, some hardware accelerators are already configured to perform predicate evaluation. Projection can be performed in parallel with predicate evaluation, thus offloading even more computations to the hardware without adding latency or affecting overall throughput. Offloaded projections increase the amount of offloaded computations for a given data transfer, thus better amortizing the costs associated with the data transfer.

Further, projection in hardware provides bandwidth and storage savings. By removing unwanted columns from each database record, projection reduces the amount of data returned to the host processor, thus making optimal use of hardware-to-host bus bandwidth. In the cases where further processing of the rows is required on the hardware and the rows need to be temporarily stored locally on the hardware, projection performed in advance of that storage helps optimize the use of the hardware's memory by reducing the amount of data stored there.

If the database records also need to be sorted on the hardware accelerator, projection may be required to extract the columns that form the sort key, making projection a prerequisite step for the sorting. Thus, hardware acceleration of column projection brings many benefits.

Some embodiments of this disclosure are projection systems that provide the ability to handle column projection of variable length columns in streaming fashion at bus speed. When coupled with other database operations offloaded to a hardware accelerator, this projection can be performed in parallel, thus offloading and accelerating additional database functions without additional latency or throughput degradation.

Figure 1:
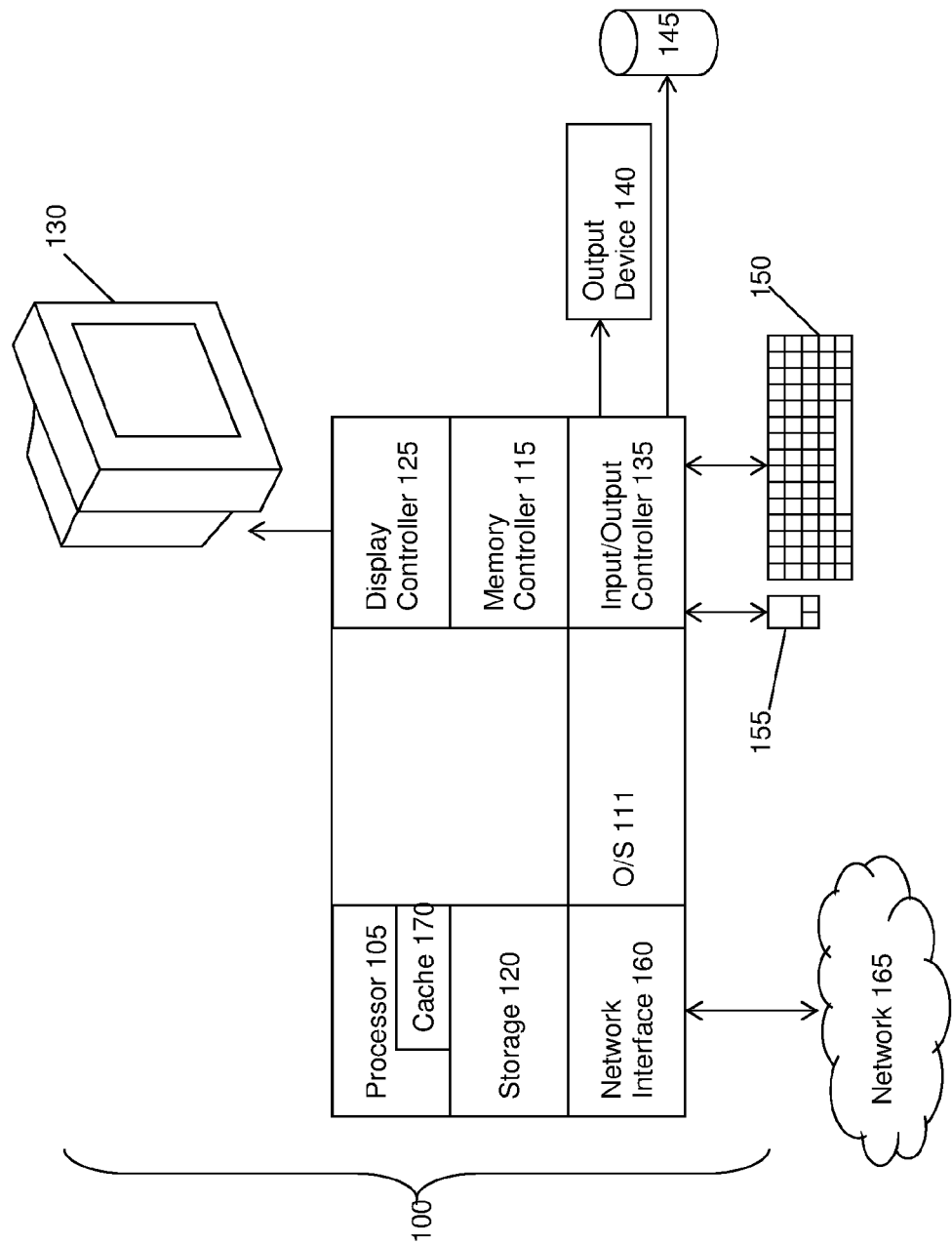
FIG. 1 is a block diagram of a computing device for implementing some or all aspects of a projection system, according to an exemplary embodiment of this disclosure.

FIG. 1 illustrates a block diagram of a computer system 100 for use in implementing a projection system or method according to some embodiments. The projection systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example but not limitation, one or more buses or other wired or wireless connections, as are known in the art. The I/O controller 135 may have additional elements, which are omitted for simplicity, such as controllers, buffers (caches), drivers, repeaters, and receivers, to enable communications.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 100, such as that illustrated in FIG. 1.

Figure 2:
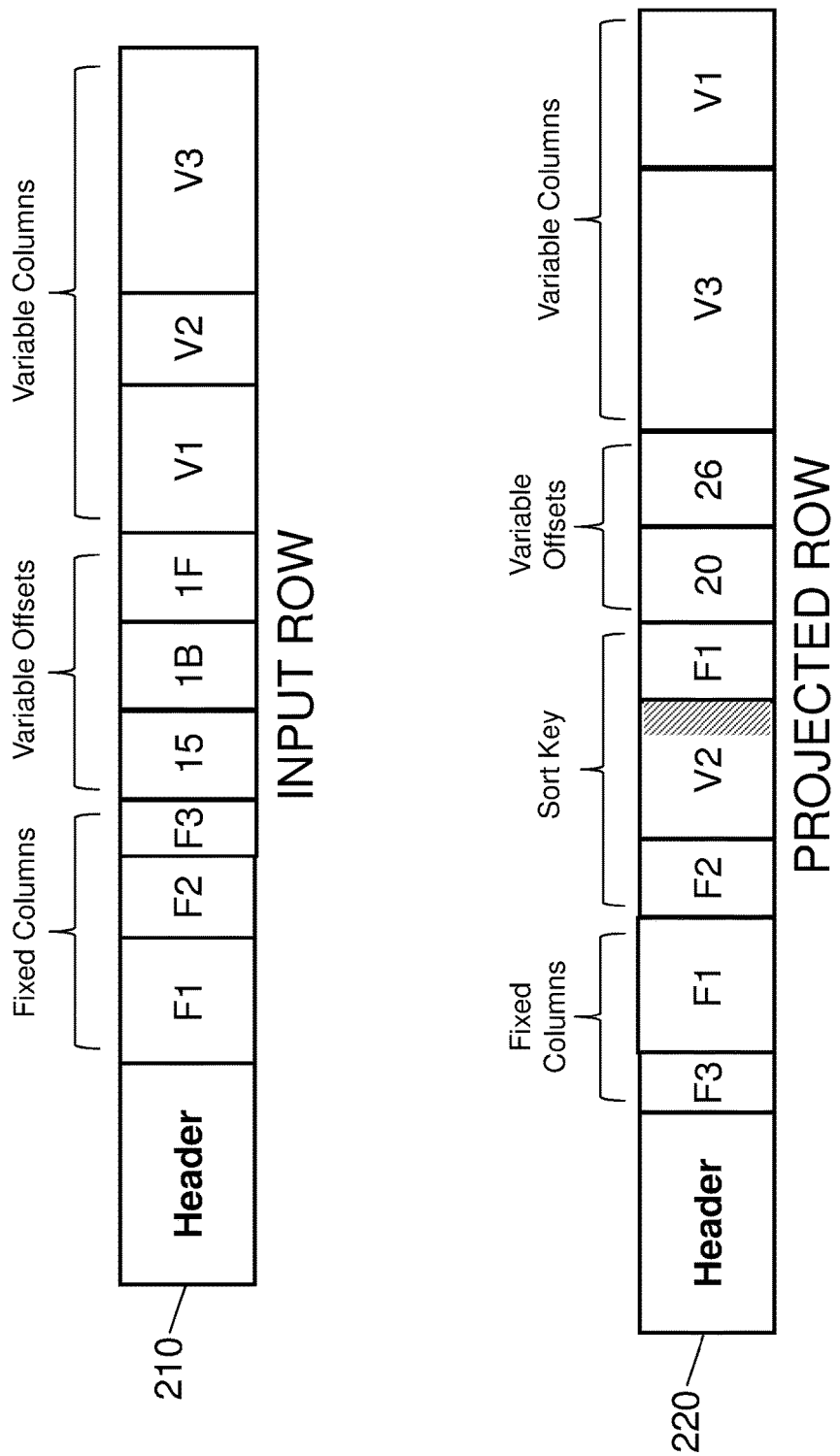
FIG. 2 is a block diagram of an input row and a projected row, as projected by the projection system, according to an exemplary embodiment of this disclosure.

FIG. 2 is a block diagram of an input row 210 and a projected row 220, as projected by the projection system 300 (FIG. 3), according to an exemplary embodiment of this disclosure. As shown, the input row 210 may include fixed-length columns, preceding variable offsets, preceding variable-length columns. Within a single row, the variable offsets indicate the positions of the variable-length columns. It will be understood that, as the lengths of the columns vary, these variable offsets can also vary from row to row.

In some embodiments, projected rows 220 output by the projection system 300 may include one or more columns that have been converted from variable-length, in the input row 210, to fixed-length by addition of padding to reach the maximize column length from among all the rows. An example of such padding is shown by Column V2 of FIG. 2, which has been padded as part of the sort key of the projected row 220. This padding may be particularly useful in cases where the database dictates that fixed columns are needed to meet the requirements of query operations, such as sort or application requirements.

Figure 3:
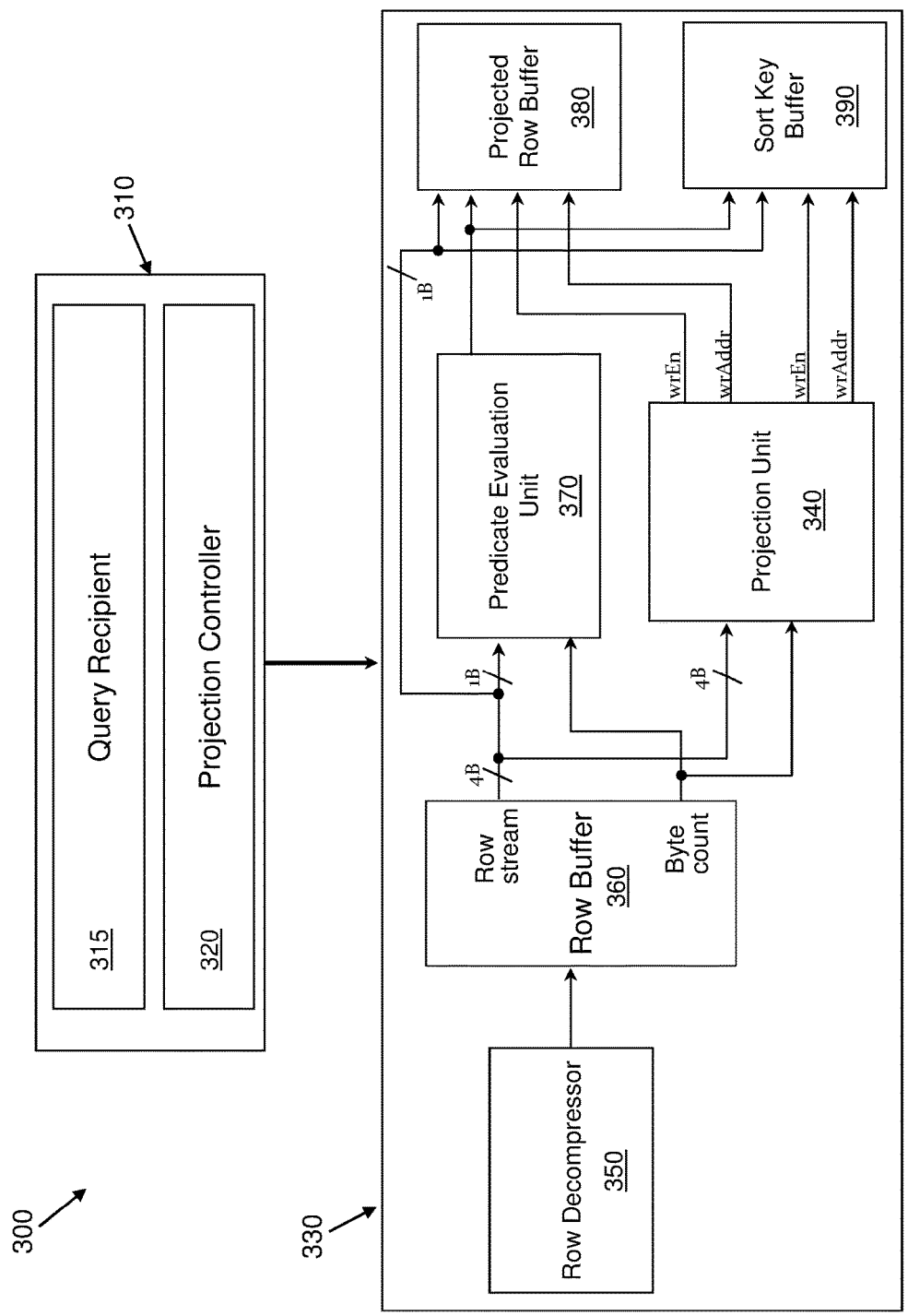
FIG. 3 is a block diagram of the projection system, according to an exemplary embodiment of this disclosure.

FIG. 3 is a block diagram of a projection system 300, according to an exemplary embodiment of this disclosure. As shown, the projection system 300 may include an offloading system 310 and a hardware accelerator 330. The offloading system 310 may include a query recipient 315 and a projection controller 320. In the offloading system 310, which may be on or in communication with the host, the query recipient 315 may receive a new database query. The query recipient 315 may then determine whether a projection is warranted by the query and, if so, may pass the query to the projection controller 320. The projection controller 320 may, in turn, construct a projection control block (PCB) representing the desired projection for the query and forward the PCB to the hardware accelerator 330 for processing. In some embodiments, multiple hardware accelerators 330 may be used and may run concurrently. In that case, the projection controller 320 may distribute projection tasks between the multiple hardware accelerators 330 as needed.

Figures 4A, 4B:
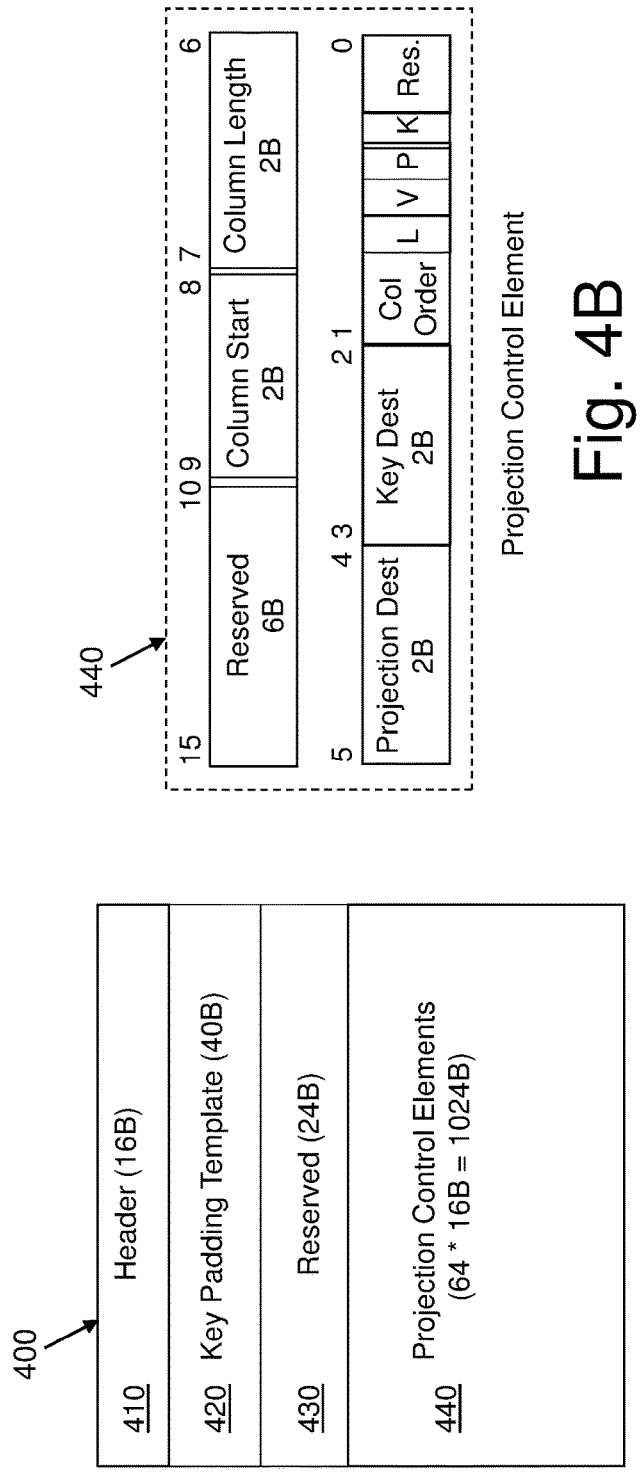
FIG. 4A is a block diagram of a projection control block generated by the projection system, according to an exemplary embodiment of this disclosure.
FIG. 4B is a block diagram of a projection control element in the projection control block, according to an exemplary embodiment of this disclosure.

FIG. 4A is a block diagram of a PCB 400, according to an exemplary embodiment of this disclosure. When receiving a query that warrants projection of database columns, the projection controller 320 may build such a PCB 400 for the hardware accelerator 330, to represent the query. As shown, the PCB 400 may include a header 410, a sort key padding template 420, a reserved section 430, and a set of projection control elements (PCE) 440.

The PCB header 410 may contain metadata about the query, including, for example, the number of fixed columns and the number of variable columns to be projected, the starting and ending positions of the variable offsets in the input rows, the length of the sort key, and the order of sorting (e.g., ascending or descending).

Some exemplary embodiments support composite sort keys up to 40 bytes long, formed using up to sixteen variable and/or fixed length columns arranged in a fixed order. The sort key padding template 420 may be populated with one or more pad characters, which may be later used by the hardware accelerator 330 to pad variable-length columns within the sort key. In an exemplary embodiment, the sort key padding template 420 may include one pad character for each potential column in sort key. Thus, the sort key padding template 420 may be, like the maximum sort key length, 40 bytes long.

Transforming the requirements of a query into this PCB data structure 400 may be a one-time preprocessing step performed in the offloading system 310 on the host processor. After being constructed, the PCB 400 may be forwarded to the hardware accelerator 330 and stored there to assist in the projection. Using this PCB structure 400, the projection system 300 may allow the use of a hardware accelerator 330 to perform sort and projection for multiple tables with both fixed and variable length columns for a wide variety of queries, without incurring the penalty of reconfiguring the hardware accelerator 330 for each query. Instead, the PCB 400 enables a soft-configuration that may be significantly more efficient.

As shown, the PCB 400 may include one or more PCEs 440, where each PCE represents a column to be projected. In the depicted PCB 400, space is allotted for up to 64 PCEs, where each PCE 440 takes up 16 bytes of space. Thus, this PCB 400 supports projection of up to 64 fixed or variable length columns. The size of the PCB 400, and thus the number of PCEs 440 that it can carry, may be determined by space limitations on the hardware accelerator 330. If sufficient storage space is provided on the hardware accelerator 330, then the size of the PCB 400 and the number of PCEs 440 may be larger. Analogously, the size of the PCB 400 may be reduced from that shown in order to reduce the space used by the PCB 400 on the hardware accelerator 330.

Each PCE 440 may be either a fixed PCE 440 or a variable PCE 440, where fixed PCEs 440 represent fixed-length columns and variable PCEs 440 represent variable-length columns. A fixed PCE 440 may contain a field for the column start position, a field for the column length, and a field for the column start position in the projected row 220 that is to be output. If a sort operation is desired, the PCE 440 may also identify the column's position in the sort key, if included in the sort key. For variable-length columns, because the column length and position are not fixed, the PCE 440 may include similar data except that the start position used may be the position of the variable offset, and the column length may be the maximum defined length across all rows in the query. Various other data, including one or more bit-length flags used to indicate information to the hardware accelerator 330, may also be used.

FIG. 4B is a block diagram of a PCE 440, according to an exemplary embodiment of this disclosure. It will be understood that the arrangement of data, and the data provided, in the depictive PCE 440 is implementation-dependent, and this PCE depiction is provided for illustrative purposes only. As shown, in FIG. 4B, a PCE 440 may include a column start field, indicating the start position of fixed column or offset position for variable column. A column length field may indicate the length of a fixed column or maximum length of variable column. The destination start field may indicate starting position of fixed column or offset value for variable column in the desired projected row 220. A key destination field may indicate the starting position of the column in the desired projected row 220. A column order field may indicate the column order in the input row 210 relative to variable columns. This field may be invalid and ignored in the case of a fixed column. The depicted L, V, P, and K fields may be bit-length fields. The L-field in FIG. 4 may indicate whether the column is the last in the input row 210. The V-field may indicate whether the column is variable-length column. Both the L-field and the V-field may be invalid and ignored in the case of a fixed-length column. The P-field may indicate whether the column is desired to be projected. And the K field may indicate whether the column is part of the sort key.

Referring back to FIG. 3, after the PCB 400 is built corresponding to the given query, the offloading system 310 may forward the PCB 400 to the hardware accelerator 330. For example, and not by way of limitation, one such hardware accelerator 330 may be a field-programmable gate array (FPGA). At streaming rate, the hardware accelerator 330 may handle each input row 210 in turn, outputting the resulting projected row 220 back to the host.

A difficulty in projecting at streaming rate arises with the presence of variable-length columns in some database records. Where variable-length columns are used, the length and starting position one or more columns in a row are not fixed and may change across different rows. This length and position information is embedded into the row 210 itself, so extracting this information from the rows themselves before projecting the record would require multiple passes through each row. Making multiple passes, however, can significantly slow the projection operation. Exemplary embodiments of the projection system 300 address this by describing the projection operation with the PCB 400. For each row, the hardware accelerator 330 may preprocess the PCEs and resolve the variability of the columns, converting the variable-length columns into a fixed, resolved format. After this resolution is performed, the projection of that row may be performed by the hardware accelerator 330 at streaming rate.

Figures 5A, 5B:
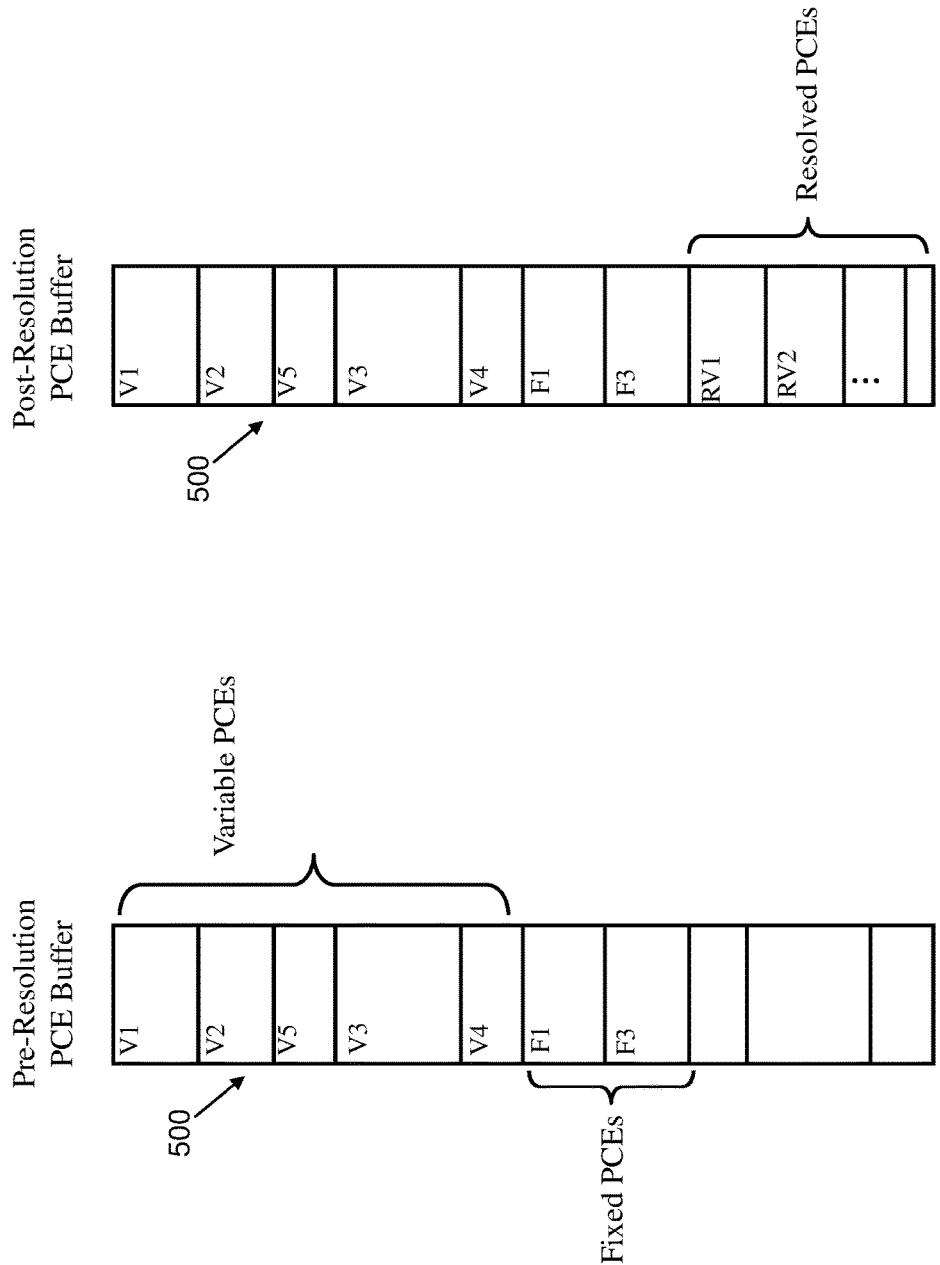
FIGS. 5A and 5B are block diagrams of projection control elements as stored in a hardware accelerator, according to an exemplary embodiment of this disclosure.

As discussed above, each PCE 440 may represent a column in the database records. Thus, the PCEs 440 may include PCEs 440 for both fixed and variable length columns. These PCEs 440 may be stored in a PCE memory buffer 500 of the hardware accelerator 330, as shown in FIGS. 5A and 5B. More specifically, FIG. 5A shows the PCE buffer 500 prior to resolving the variable-length columns, and FIG. 5B shows the memory buffer 500 after such resolution.

Together, the PCEs 440 may contain information describing the offloaded projection to the accelerator 330. For each projection, the collection of PCEs 440 may describe the requested projection, where each PCE 440 corresponds to a column of the database records. The PCEs 440 may be forwarded once to the accelerator 330, stored in the PCE buffer 500, and then processed by the accelerator 330 to perform the required projection.

Referring back to FIG. 3, as shown, a projection unit 340 may be integrated with other aspects of the hardware accelerator 330. The hardware accelerator 330 may also include a standard row decompressor 350, row buffer 360, and predicate evaluation unit 370. The projection unit 340 may perform projection at streaming rate, in parallel with predicate evaluation performed by the predicate evaluation unit 370. Results from the projection unit 340 may output to a projected row buffer 380 and a sort key buffer 390, which may perform post-projection processing before returning the projected rows 220 to the host. For each byte streamed, the projection unit 340 may use the PCEs 440 to decide whether the byte is to be projected and may generate the appropriate write-enables for the projected row buffer 380 and sort key buffer 390.

To provide beneficial row processing throughput on the accelerator 330, the predicate evaluation logic will generally be designed to process database records without stalling the incoming row stream. Thus, the projection unit 340 may operate at streaming rate as well, so as to maintain the stream of rows 210 through the accelerator 330. Fixed-length columns are amenable to streaming, as the positions and lengths of these columns are known without having to first examine each row. Exemplary embodiments enable this streaming rate processing for variable-length columns as well.

As shown in FIG. 2, the starting position of a variable-length column within a current row may be represented by the column offset that is present as part of the row itself, following the fixed-length columns. If streaming a row without preprocessing using the PCEs 440, the column offsets might conceivably be streamed first, followed by the variable-length columns. This would make capturing the variable-length columns in a single pass difficult. An exemplary embodiment avoids making multiple passes through a current row 210, where the first pass is used solely to process the variable offsets for computing the positions and lengths of the variable-length columns. An exemplary embodiment also avoids staging the row 210 in a buffer and accessing different pieces of the row as necessary in random order. Rather, an exemplary projection system 300 employs a hybrid technique that enables maintaining both the throughput and the streaming model of row processing.

Referring back to FIG. 5A, at the start of a new query, the PCEs 440 for the fixed length columns may be stored in the lower half of the PCE buffer 500, in the order in which these columns appear in the input rows 210. The PCEs 440 representing the variable-length columns may be stored in the top half of the PCE buffer 500, in the order in which the variable columns are desired to appear in the projected row 220.

When each input row 210 is streamed, the row may first be staged in a temporary row buffer 360. During this staging, the hardware projection unit 340 may iterate through the variable PCEs 440, which contain pointers to the variable column offsets within the row 210. For each PCE 440, the pointers may be used to read two column offsets from the row (i.e., for the current and the next variable column). Based on this information, the projection unit 340 may compute the starting position and the length of the current variable-length column represented by the PCE. The starting position is equal to the current column offset, and the length is the difference between the current offset and the next offset. In the input row 210, the destination of the first variable column may be immediately after the last variable offset. This may be a fixed position, as all prior positions in the row 210 are fixed. For subsequent variable columns, the destination of that column may be computed as a sum of the previous variable column position and the length of the previous variable column. For the last variable-length column of the row 210, which may be indicated by a bit in the variable PCE, the length of that column may be computed using the current offset along with the total row length, which can be extracted from the row header.

As the column positions are computed from the PCEs 440, these positions may be placed into the projected row buffer 380, as they may be needed to interpret the resulting projected row 220, in that these positions point to the start of the projected variable columns. Computation of information relating to each variable-length column may result in resolution of a variable PCE 440 into a fixed, resolved PCE 440 for the current column. For each row in a query, the resolved PCEs 440 may be stored in the lower half of the PCE buffer below the fixed length PCEs 440, in the order in which they appear in the input row 210.

The act of resolving the PCEs may be performed for each input row 210, before that row is streamed. After the variable PCEs 440 have been resolved for a particular row, all the columns may be treated as fixed length, because the start positions and lengths are now known for the variable-length columns in the current input row 210. The current row 210 may then be streamed over the predicate evaluation unit 370 and the projection unit 340, for example, at a rate of one byte per cycle.

While the row is being streamed, the projection unit 340 may step through the resolved PCEs 440 in the bottom half of the PCE buffer 600 and capture the required bytes for projection by comparing the input byte count against the column start position field corresponding to each resolved PCE 440. With the PCEs 440 being stored in the order in which the corresponding column appears in the input row 210, the projection unit 340 can compare a single PCE at a time to the current row 210 being streamed. After a PCE's corresponding column has been projected for the row 210, the next PCE may be loaded from the PCE buffer 500. To handle the case of multiple consecutive one-byte columns being projected, PCE prefetch logic may be used to allow for a new PCE 440 being loaded every cycle without stalls. Thus, the projection unit 340 may use the PCEs 440 to step through the input row 210 while performing efficient projections of the columns within that row 210.

After the current row 210 is streamed, with output being sent to the projected row buffer 380, the projected row buffer 380 may contain a corresponding projected row 220, along with the fixed and variable length columns as well as the variable column offsets, which were written while resolving the PCEs 440. The sort key, if any, may then be copied from the sort key buffer 390 into the projected row 220 to completely format the projected row 220 as required. This copying process for the row may be performed when the PCEs for the next row are being resolved, so as not to use more time than needed.

Figure 6:
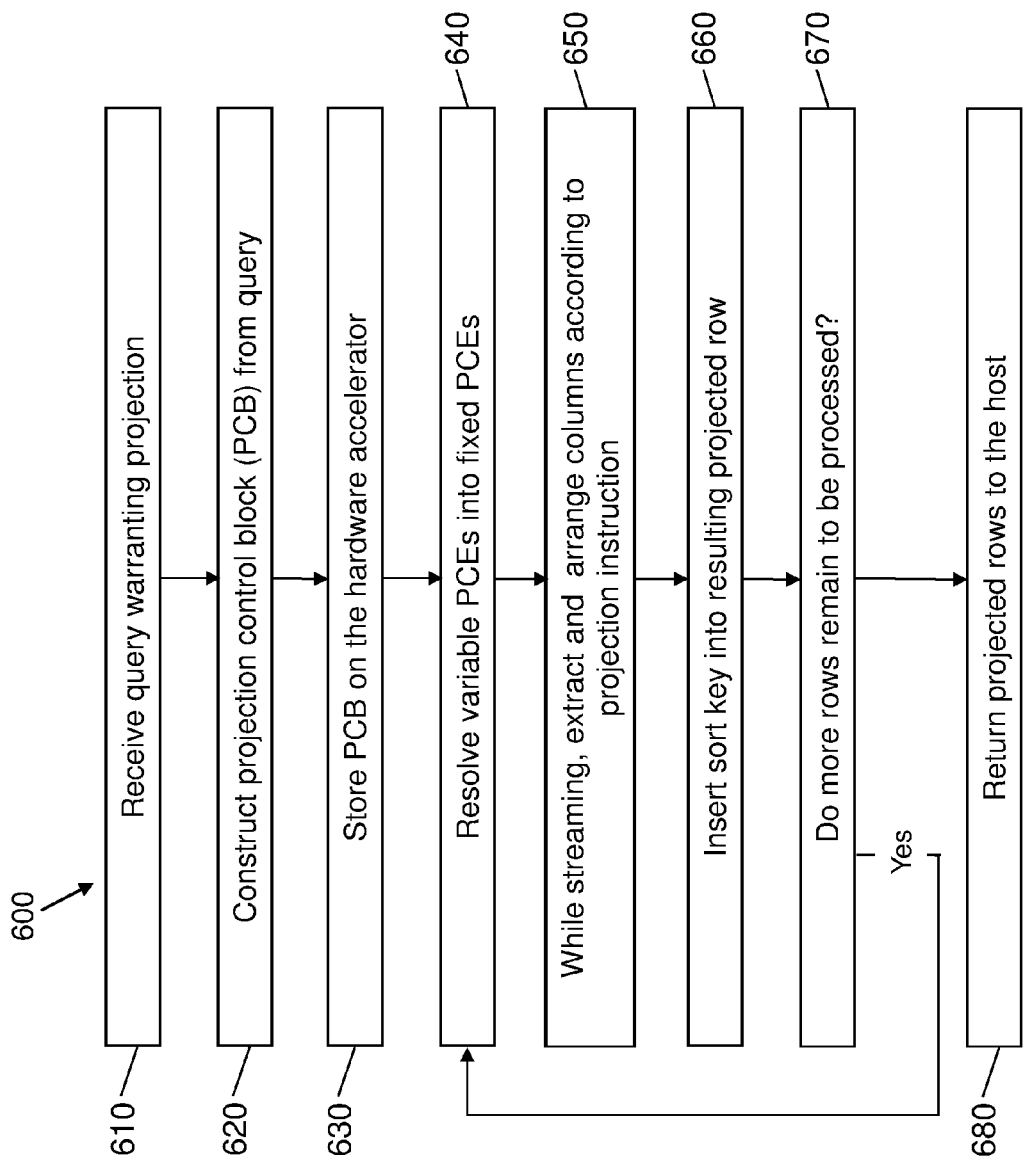
FIG. 6 is a flow diagram of a method for performing a projection operation, according to an exemplary embodiment of this disclosure.

In summary, FIG. 6 is a flow diagram of a method 600 for performing a projection operation, according to an exemplary embodiment of this disclosure. At block 610, a query requiring projection may be received. At block 620, a PCB 400 may be built from the query. At block 630, the PCB 400 may be stored on the hardware accelerator 330, such as in the PCE buffer 500. At block 640, for a row of data, the variable PCEs 440 of the PCB 400 may be resolved into fixed PCEs 440. At block 650, the desired columns may be extracted from the row and arranged according to the projection instruction, based on the information provided in the PCB 400. At block 660, the sort key may be inserted into the resulting projected row 220. At decision block 670, it may be determined whether additional rows remain to be processed for the projection. If additional rows remain, the method 600 may return to block 640 to process PCEs for that row. At block 680, the projected rows may be output to the host.

Figure 7:
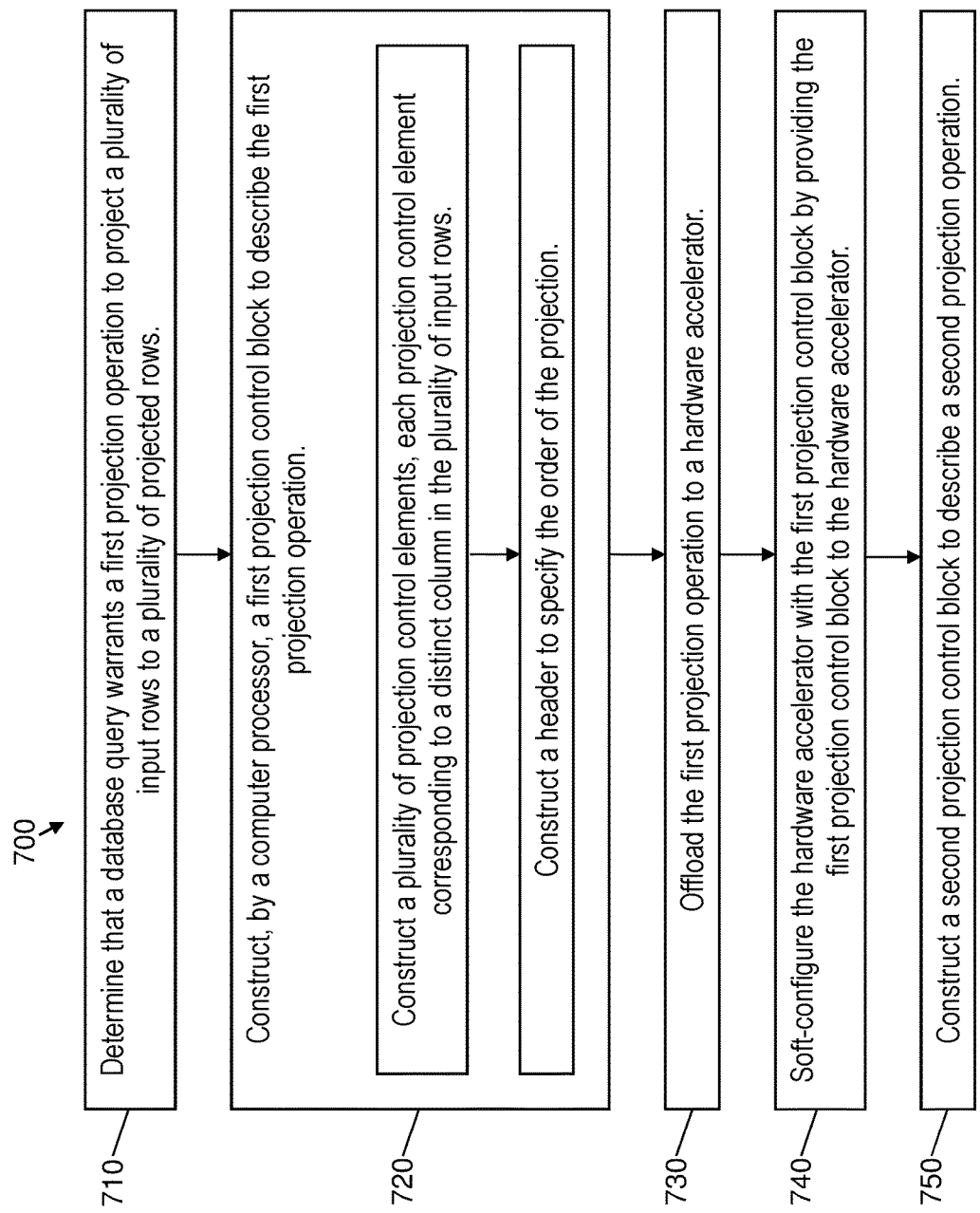
FIG. 7 is a flow diagram of another method for performing a projection operation, according to an exemplary embodiment of this disclosure.

FIG. 7 is another flow diagram of a method 700 for performing a projection operation by configuring a hardware accelerator, according to some embodiments of this disclosure. As shown, at block 710, it may be determined that a database query warrants a first projection operation to project a plurality of input rows to a plurality of projected rows. At block 720, a first projection control block may be constructed, by a computer processor, to describe the first projection operation. This construction may include, for example, constructing a plurality of projection control elements, where each projection control element corresponds to a distinct column in the plurality of input rows, and constructing a header to specify the order of the projection. At block 730, the first projection operation may be offloaded to a hardware accelerator. At block 740, the hardware accelerator may be soft-configured with the first projection control block by providing the first projection control block to the hardware accelerator. At block 750, a second projection control block may be constructed to describe a second projection operation.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining that a database query warrants a first projection operation to project a plurality of input rows to a plurality of projected rows, wherein each of the plurality of input rows has one or more variable-length columns;
    constructing, by a computer processor, a first projection control block to describe the first projection operation, wherein constructing the first projection control block comprises:
        constructing a plurality of projection control elements, each projection control element corresponding to a distinct column in the plurality of input rows; and
        constructing a header to specify the order of the projection, wherein the projection control elements represent variable-length columns and are arranged in the first projection control block according to a column order of the plurality of projected rows control elements in the first projection control block;
        wherein the first projection control block specifies a sort key for the plurality of projected rows; and
        wherein constructing the first projection control block comprises providing a sort key padding template, specifying a character for padding each column in the sort key;
    offloading the first projection operation to a hardware accelerator;
    providing the first projection control block to the hardware accelerator to soft-configure the hardware accelerator with the first projection control block, to perform the first projection operation, wherein the first projection control block enables the hardware accelerator to perform the first projection operation at streaming rate, and wherein the streaming rate is a rate sufficient for the hardware accelerator to process the plurality of input rows without stalling an incoming row stream;
    receiving, from the hardware accelerator, over a hardware-to-host bus, a result of the first projection operation performed on the hardware accelerator, wherein the result of the first projection operation requires reduced storage in memory compared to the plurality of input rows; and
    constructing a second projection control block to describe a second projection operation, wherein the second projection control block soft-configures the hardware accelerator to perform the second projection operation.

2. The computer-implemented method of claim 1, wherein constructing the first projection control block comprises constructing a projection control element corresponding to a variable-length column in the plurality of input rows, wherein the projection control element specifies information about the variable offsets and the lengths of the variable-length column in the plurality of input rows.

* * * * *